(12) United States Patent
Wang et al.

(10) Patent No.: US 12,490,393 B2
(45) Date of Patent: Dec. 2, 2025

(54) RETRACTABLE MECHANISM FOR DISPLAY DEVICE AND DISPLAY DEVICE

(71) Applicant: BOE Technology Group Co., Ltd., Beijing (CN)

(72) Inventors: Zongyuan Wang, Beijing (CN); Hong Zhu, Beijing (CN); Sitong Chen, Beijing (CN); Lijuan Zhao, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/578,728

(22) PCT Filed: Dec. 9, 2022

(86) PCT No.: PCT/CN2022/138137
§ 371 (c)(1),
(2) Date: Jan. 12, 2024

(87) PCT Pub. No.: WO2024/119516
PCT Pub. Date: Jun. 13, 2024

(65) Prior Publication Data
US 2025/0107016 A1   Mar. 27, 2025

(51) Int. Cl.
*H05K 5/02* (2006.01)
*G06F 1/16* (2006.01)

(52) U.S. Cl.
CPC ......... *H05K 5/0217* (2013.01); *G06F 1/1624* (2013.01); *G06F 1/1652* (2013.01)

(58) Field of Classification Search
CPC ... H05K 5/0217; G06F 1/1624; G06F 1/1637; G06F 1/1652; H04M 1/0235; H04M 1/0268
See application file for complete search history.

(56) References Cited

U.S. PATENT DOCUMENTS 11,768,519 B2 *   9/2023   Feng ..................... G06F 1/1637
                                                   361/679.27
11,809,231 B2 *  11/2023   Feng ..................... G06F 1/1652
(Continued)

FOREIGN PATENT DOCUMENTS

CN   113286022 A   8/2021
CN   113301201 A   8/2021
(Continued)

*Primary Examiner* — Sagar Shrestha
(74) *Attorney, Agent, or Firm* — XSENSUS LLP

(57) ABSTRACT

Provided is a retractable mechanism for a display device. The retractable mechanism includes: a first housing, a second housing, and a drive assembly, the first housing being movably connected to the second housing; wherein the drive assembly is disposed in the first housing and is connected to the first housing; the retractable mechanism has a connected state and a disconnected state, in the connected state, the second housing is connected to the drive assembly and is able to extend or retract relative to one side of the first housing under driving by the drive assembly, in the disconnected state, the second housing is separated from the drive assembly; and the retractable mechanism is configured to be switched from the connected state to the disconnected state in response to an acceleration of the second housing moving relative to the first housing being greater than a predetermined value.

20 Claims, 13 Drawing Sheets

(56) References Cited

U.S. PATENT DOCUMENTS

| | | | |
|---|---|---|---|
| 2021/0099557 A1* | 4/2021 | Cha | G06F 1/1624 |
| 2022/0183167 A1 | 6/2022 | Liu | |
| 2022/0418123 A1* | 12/2022 | Liu | H04M 1/0237 |

FOREIGN PATENT DOCUMENTS

| | | | |
|---|---|---|---|
| CN | 113472925 | A | 10/2021 |
| CN | 113709279 | A | 11/2021 |
| CN | 215068970 | U | 12/2021 |
| CN | 113888981 | A | 1/2022 |
| CN | 114125106 | A | 3/2022 |
| CN | 114125107 | A | 3/2022 |
| CN | 114530094 | A | 5/2022 |
| CN | 114598759 | A | 6/2022 |
| CN | 114677920 | A | 6/2022 |
| CN | 115225736 | A | 10/2022 |
| CN | 115623104 | A | 1/2023 |

* cited by examiner

RETRACTABLE MECHANISM FOR DISPLAY DEVICE AND DISPLAY DEVICE

CROSS-REFERENCE TO RELATED APPLICATION

This application is a U.S. national phase application based on PCT/CN2022/138137, filed on Dec. 9, 2022, the disclosure of which is incorporated herein by reference in its entirety.

TECHNICAL FIELD

The present disclosure related the field of display, and in particular to a retractable mechanism for a display device and a display device.

BACKGROUND

Flexible display panels are increasingly applied in a variety of display devices, such that functions such as folding and rolling are realized in the display device. In this way, the display devices adaptively have different display areas.

SUMMARY

Embodiments of the present disclosure provide a retractable mechanism for a display device and a display device. The technical solutions are described as follows.

According to some embodiments of the present disclosure, a retractable mechanism for a display device is provided. The retractable mechanism for a display device includes a first housing, a second housing and a drive assembly, the first housing being movably connected to the second housing; wherein
  the drive assembly is disposed in the first housing and is connected to the first housing;
  the retractable mechanism has a connected state and a disconnected state, in the connected state, the second housing is connected to the drive assembly and is able to extend or retract relative to one side of the first housing under driving by the drive assembly, and in the disconnected state, the second housing is separated from the drive assembly; and
  the retractable mechanism is configured to be switched from the connected state to the disconnected state in response to an acceleration of the second housing moving relative to the first housing being greater than a predetermined value.

In some embodiments, the second housing includes a movable housing body and a push rod, wherein the movable housing body is movably connected to the first housing, one end of the push rod is connected to the movable housing body, and the other end of the push rod is disposed in the first housing and is connected to the drive assembly.

In some embodiments, a strip-shaped slide slot is defined in the push rod, wherein a length direction of the strip-shaped slide slot is consistent with a retraction direction of the second housing, an end, away from the movable housing body, of the strip-shaped slide slot has a lock portion, and the lock portion is connected to the strip-shaped slide slot; and
  the drive assembly includes a fixed portion and a movable portion, the fixed portion is connected to the first housing, the movable portion is movably connected to the fixed portion, the movable portion is snap-fitted into the lock portion in the connected state, and in the disconnected state, the movable portion is in the strip-shaped slide slot and is in clearance fit with the strip-shaped slide slot.

In some embodiments, two catch bumps are disposed on opposite side walls the strip-shaped slide slot, and the catch bumps are at a junction of the strip-shaped slide slot and the lock portion.

In some embodiments, the catch bump has a first ramped surface, the first ramped surface is on a side, close to the lock portion, of the catch bump.

In some embodiments, the catch bump further has a second ramped surface, wherein the second ramped surface is on a side, away from the lock portion, of the catch bump, and a slope of the ramped surface is less than a slope of the first ramped surface.

In some embodiments, the movable housing body includes a support portion and a sliding support plate, wherein the sliding support plate and the push rod are connected to one side of the support portion, and the sliding support plate includes a plurality of comb support plates, wherein a length direction of each of the comb support plates is consistent with a retraction direction of the second housing, and a plurality of sockets are defined in an outer surface of the first housing, wherein the plurality of comb support plates are disposed in the plurality of sockets.

In some embodiments, the comb support plate includes a strip portion and a spade portion, wherein one end of the strip portion is connected to the support portion, the spade portion is disposed at the other end of the strip portion and connected to the strip portion, and a distance from a side, away from a bottom surface of the socket, of the spade portion to the bottom surface of the socket is less than a distance from a side, away from the bottom surface of the socket, of the strip portion to the bottom surface of the socket.

In some embodiments, a circuit board accommodation recess is further defined in the outer surface of the first housing further, wherein the circuit board accommodation recess is disposed at end portions of the plurality of sockets and is connected to the end portions of the plurality of sockets, and in response to the second housing being retracted, the spade portion is received in the circuit board accommodation recess.

In some embodiments, a friction-reducing layer is disposed on a side, away from the bottom surface of the socket, of the spade portion.

According to some embodiments of the present disclosure, a display device is provided. The display device includes a flexible display panel and a retractable mechanism as described above, wherein the flexible display panel is connected to the first housing and the second housing.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

In order to make the objects, technical solutions and advantages of the present disclosure clearer, embodiments of the present disclosure are described in further detail below in conjunction with the accompanying drawings.

Unless otherwise defined, technical or scientific terms used herein shall have their ordinary meaning as understood by a person of ordinary skill in the art to which the present disclosure related. The terms "first," "second," "third," and the like, as used in the description of the patent application and the claims, do not indicate any order, number, or importance, but are used only to distinguish the different components. Similarly, the words "one" or "a" and similar terms do not indicate a limitation of quantity, but rather the existence of at least one. Similar terms such as "includes" or "contains" mean that the elements or objects before "includes" or "contains" encompasses the elements or objects listed after "includes" or "includes" and their equivalents, and does not exclude other elements or objects. Words such as "connected" or "linked" are not limited to physical or mechanical connections, but may include electrical connections, whether direct or indirect. The words "up," "down," "left," "right," and the like are used only to indicate relative positional relationships. In the case that the absolute position of the described object is changed, the described relative positional relations may be changed accordingly.

A conventional rollable display device typically includes two housings that are extendable and retractable relative to each other and a flexible display panel. The flexible display panel is arranged on the two housings. By the relative extension and retraction of the two housings, an area of the flexible display panel flattened on a front side of the display device is changed, and hence an area of a display region is changed.

In such display devices, the extension and retraction of the two housings can be driven by a drive assembly using a motor or the like as a power source. Although it is more convenient over a manual operation, where the display device is accidentally dropped or the like, the internal structure such as the drive assembly is prone to damages under the impact of an external force and consequently normal use of the display device is affected.

Figure 1:
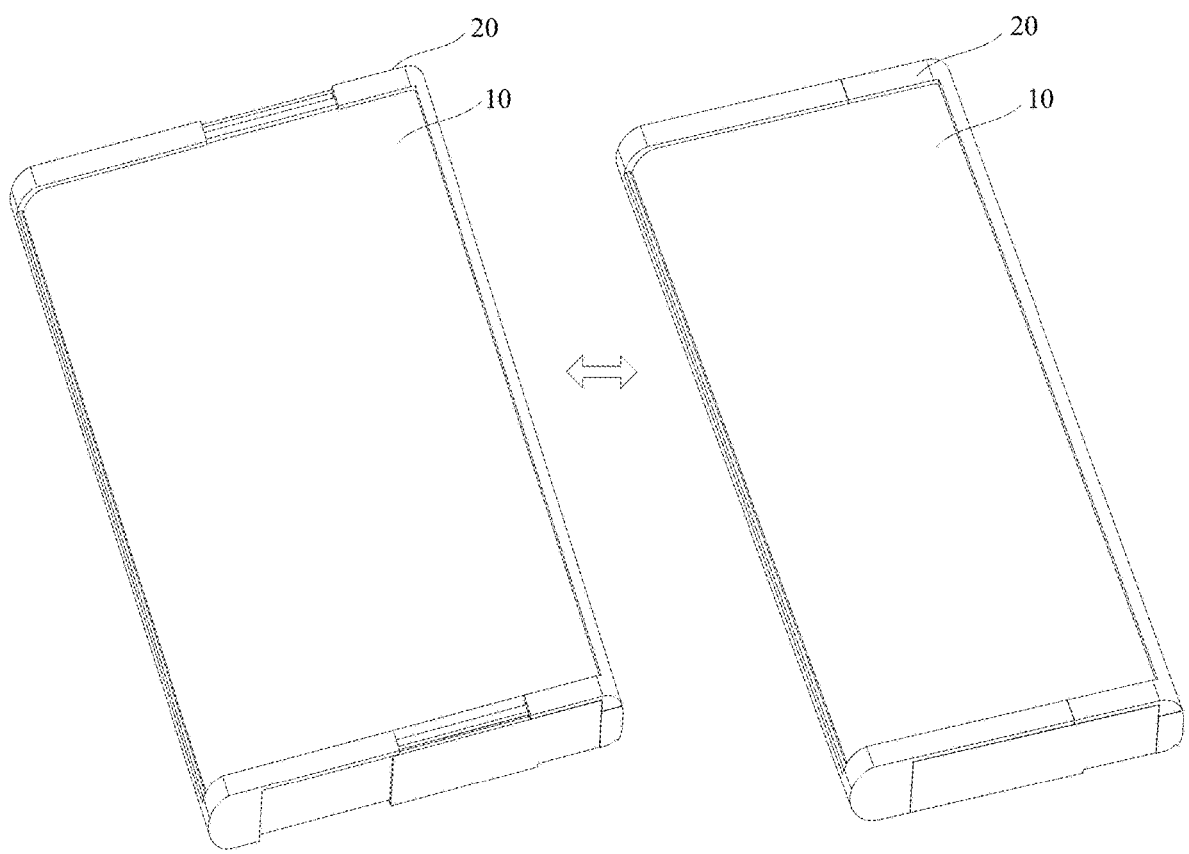
FIG. 1 is a schematic diagram of a structure of a display device according to some embodiments of the present disclosure.
Figure 2:
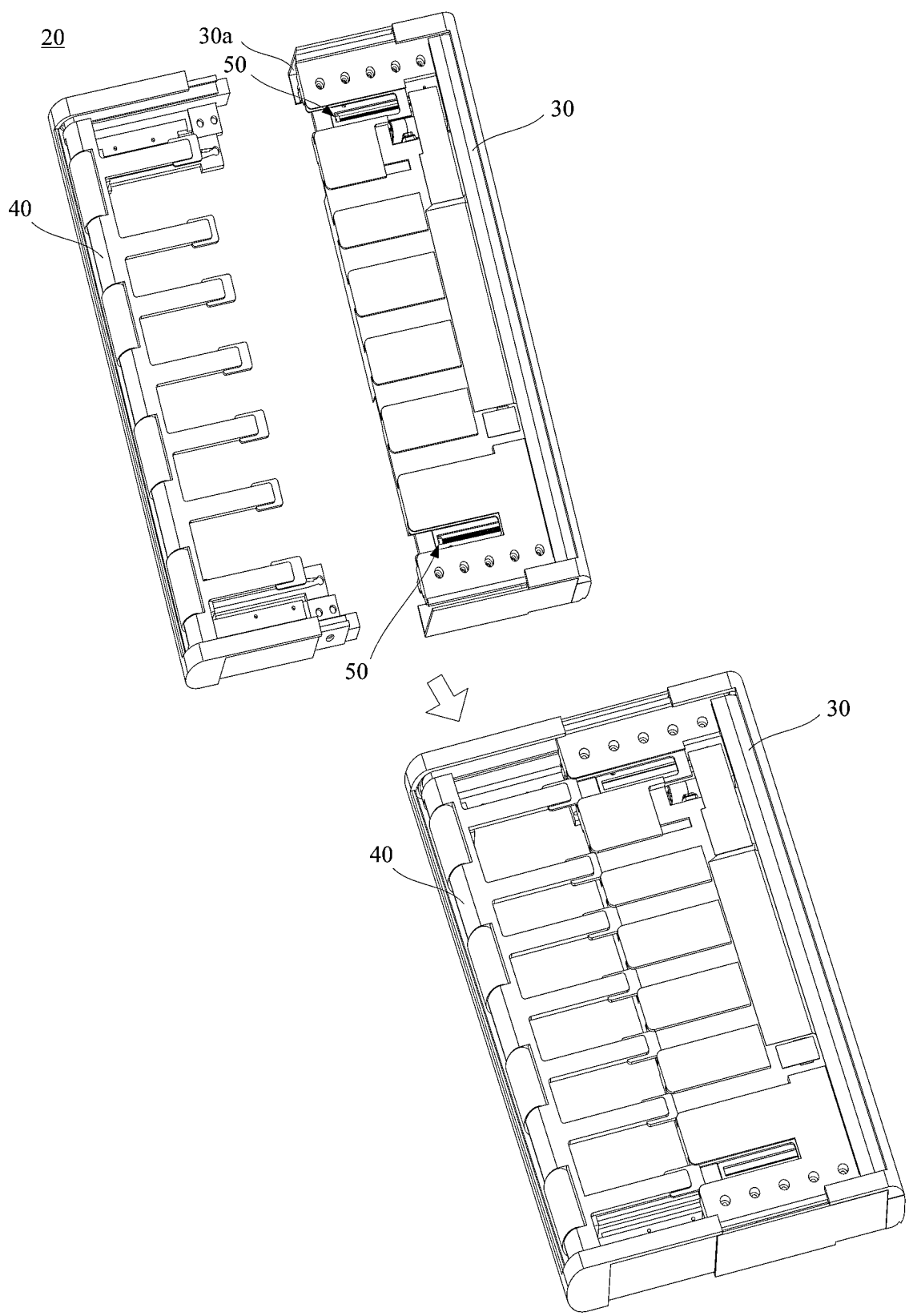
FIG. 2 is a schematic diagram of an assembly of a retractable mechanism according to some embodiments of the present disclosure.

FIG. 1 is a schematic diagram of a structure of a display device according to some embodiments of the present disclosure. The display device may be, but is not limited to, a cell phone, a tablet computer. A cell phone is used as an example in the embodiments of the present disclosure. As shown in FIG. 1, the display device includes a retractable mechanism 20 and a flexible display panel 10. FIG. 2 is a schematic diagram of an assembly of a retractable mechanism according to some embodiments of the present disclosure. As shown in FIG. 2, the retractable mechanism 20 includes a first housing 30, a second housing 40, and a drive assembly 50. The first housing 30 is movably connected to the second housing 40.

One side of the first housing 30 has an opening 30*a*, and a portion of the second housing 40 is disposed in the opening 30*a*. The second housing 40 is capable of extension and retraction relative to the first housing 30. By adjusting the second housing 40 relative to the first housing 30, a display area of the flexible display panel 10 can be changed.

Figure 3:
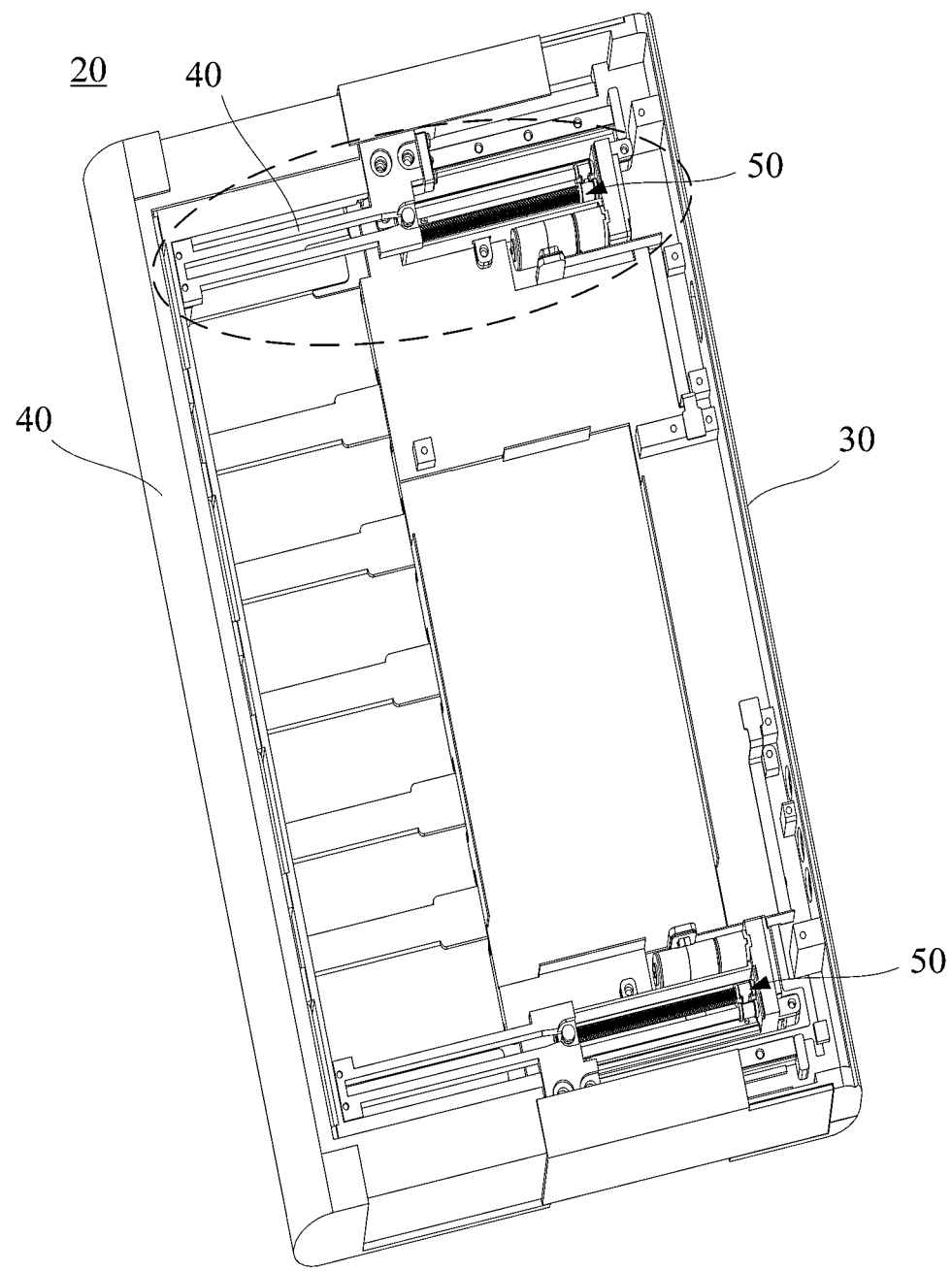
FIG. 3 is a schematic diagram of a structure of a retractable mechanism according to some embodiments of the present disclosure.

FIG. 3 is a schematic diagram of a structure of a retractable mechanism according to some embodiments of the present disclosure. FIG. 3 and FIG. 2 show opposite sides of the retractable mechanism, and at least a portion of the structure of the first housing 30 is removed in FIG. 3. As shown in FIG. 3, a drive assembly 50 is disposed in and connected to the first housing 30.

In the embodiments of the present disclosure, the retractable mechanism 20 has a connected state and a disconnected state. In the attached state, the second housing 40 is attached to the drive assembly 50, and the second housing 40 is capable of extension and retraction relative to one side of the first housing 30 under driving by the drive assembly 50. In the disconnected state, the second housing 40 is separated from the drive assembly 50.

The retractable mechanism 20 is configured to switch from the connected state to the disconnected state in the case that the second housing 40 moves relative to the first housing 30 with an acceleration greater than a predetermined value.

The retractable mechanism 20 to switch from the connected state to the disconnected state in the case that the acceleration of the second housing 40 moving relative to the first housing 30 is greater than a predetermined value. In the case that the acceleration of the second housing 40 moving relative to the first housing 30 is greater than a predetermined value, it indicates that the second housing 40 is impacted by a large external force. At this time, by switching the retractable mechanism 20 from the connected state to the disconnected state, the second housing 40 is separated from the drive assembly 50 disposed in the first housing 30, which avoids damaging the drive assembly 50 and is conducive to prolonging the service life.

Figure 4:
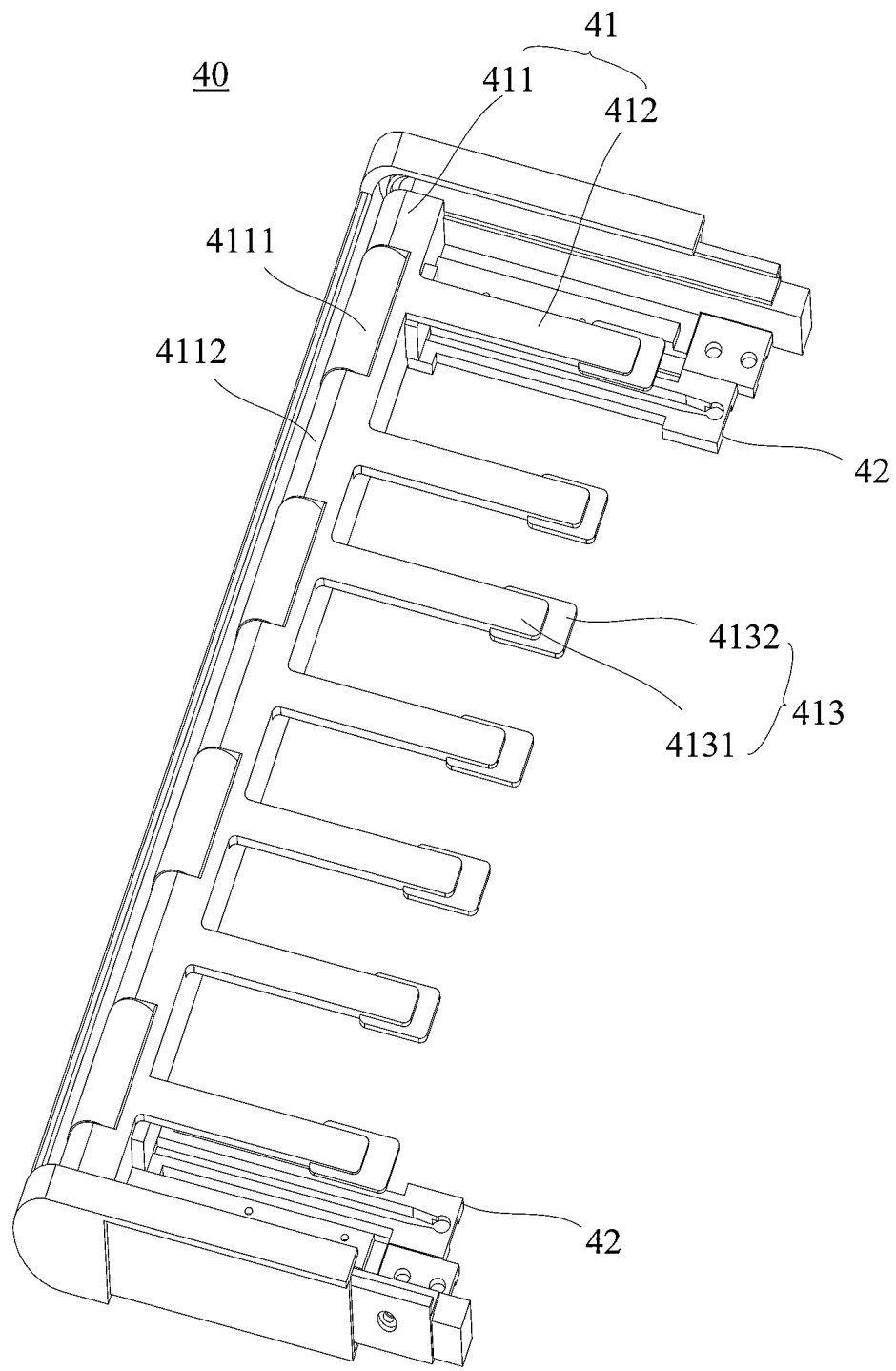
FIG. 4 is a schematic diagram of a structure of a second housing according to some embodiments of the present disclosure.

FIG. 4 is a schematic diagram of the structure of the second housing according to some embodiments of the present disclosure. As shown in FIG. 4, the second housing 40 includes a movable housing body 41 and a push rod 42.

The movable housing body 41 is movably connected to the first housing 30. One end of the push rod 42 is connected to the movable housing body 41, and the other end of the push rod 42 is disposed in the first housing 30 and connected to the drive assembly 50.

By providing the push rod 42, the push rod 42 is utilized to be connected to the drive assembly 50 in the first housing 30, and the power of the drive assembly 50 is transmitted to the second housing 40, such that the second housing 40 is extended or retracted relative to the first housing 30.

The movable housing body 41 and the push rod 42 form a structure or are two removable portions. The second housing 40 is a metal member, a non-metallic member, or one portion is a metal member and the other portion is a non-metallic member. For example, the movable housing body 41 is a non-metallic member and the push rod 42 is a metallic member.

Figure 5:
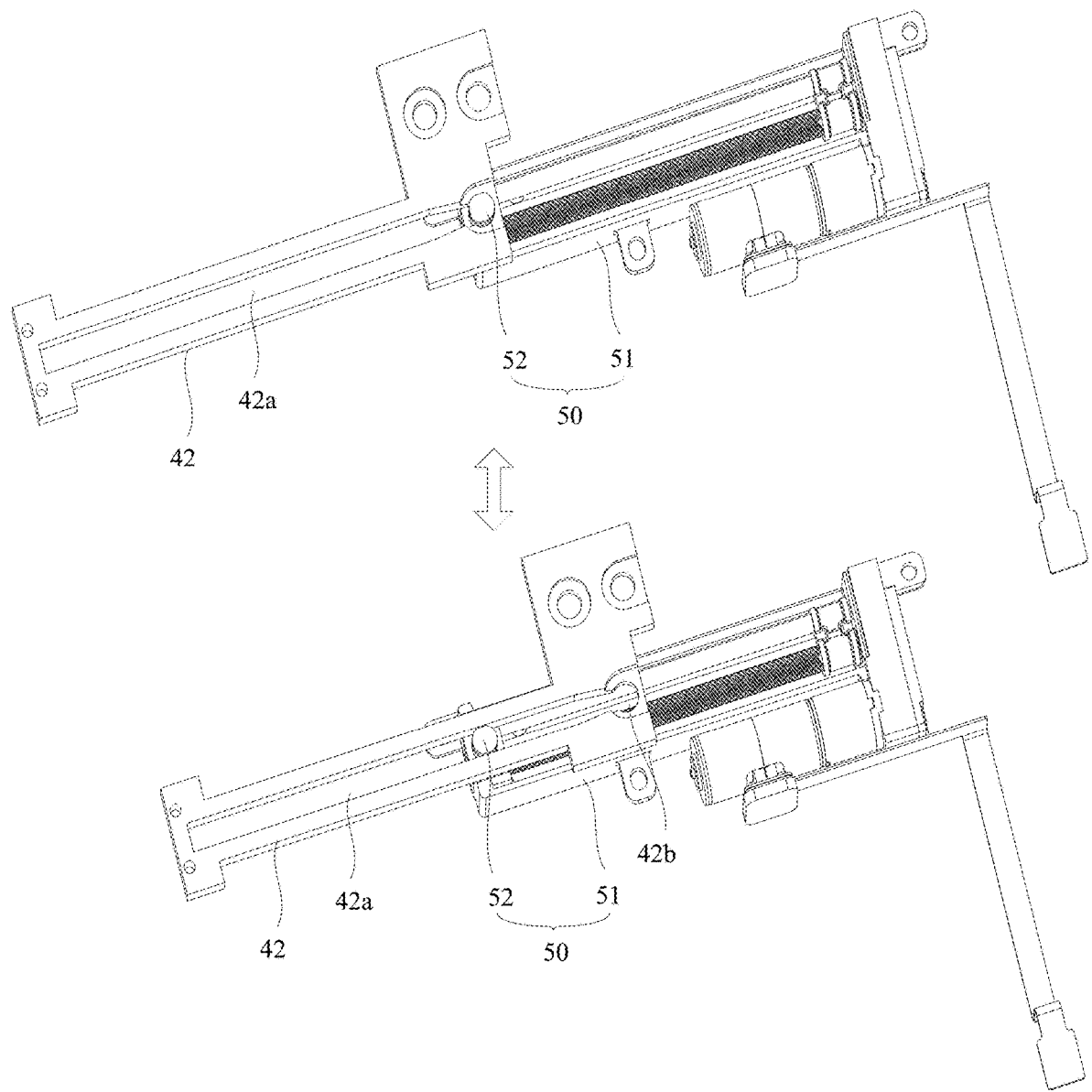
FIG. 5 is a schematic diagram of a fitting of a push rod with a drive assembly according to some embodiments of the present disclosure.

FIG. 5 is a schematic diagram of a fitting of the push rod with the drive assembly according to some embodiments of the present disclosure. The push rod 42 and the drive assembly 50 shown in FIG. 5 are within the dashed box in FIG. 3. As shown in FIG. 5, the push rod 42 has a strip-shaped slide slot 42a. The length direction of the strip-shaped slide slot 42a is consistent with the retraction direction of the second housing 40, and the end, away from the movable housing body 41, of the strip-shaped slide slot 42a has a lock portion 42b, and the lock portion 42b is connected to the strip-shaped slide slot 42a.

The drive assembly 50 includes a fixed portion 51 and a movable portion 52, the fixed portion 51 is connected to the first housing 30, and the movable portion 52 is movably connected to the fixed portion 51.

In the connected state, i.e., the state shown in the upper figure of FIG. 5, the movable portion 52 is snap-fitted into the lock portion 42b. In the disconnected state, i.e., the state shown in the lower figure of FIG. 5, the movable portion 52 is in the strip-shaped slide slot 42a is in clearance fit with the strip-shaped slide slot 42a.

The movable portion 52 is able to move relative to the fixed portion 51 in the drive assembly 50. In the case that the retractable mechanism 20 is in the connected state, the movable portion 52 is able to move the second housing 40 relative to the first housing 30 by the push rod 42, because the movable portion 52 is snap-fitted into the lock portion 42b, when the movable portion 52 is moved relative to the fixed portion 51.

In the case that the retractable mechanism 20 is in the disconnected state, the movable portion 52 and the push rod 42 can move relative to each other, because the movable portion 52 is in the strip-shaped slide slot 42a and is in clearance fit with the strip-shaped slide slot 42a.

The lock portion 42b is connected to the strip-shaped slide slot 42a. In the case that the second housing 40 extends relative to the first housing 30, and the retractable mechanism 20 is falling in the connected state, causing the second housing 40 to be impacted, the movable portion 52 is disconnected to the lock portion 42b under the action of the impact, such that the push rod 42 is able to move relative to the movable portion 52, and in the process of the second housing 40 retracting to the first housing 30 under the action of impact, the impact is not transmitted to the drive assembly 50 and damage to the drive assembly 50 is avoided.

Figure 6:
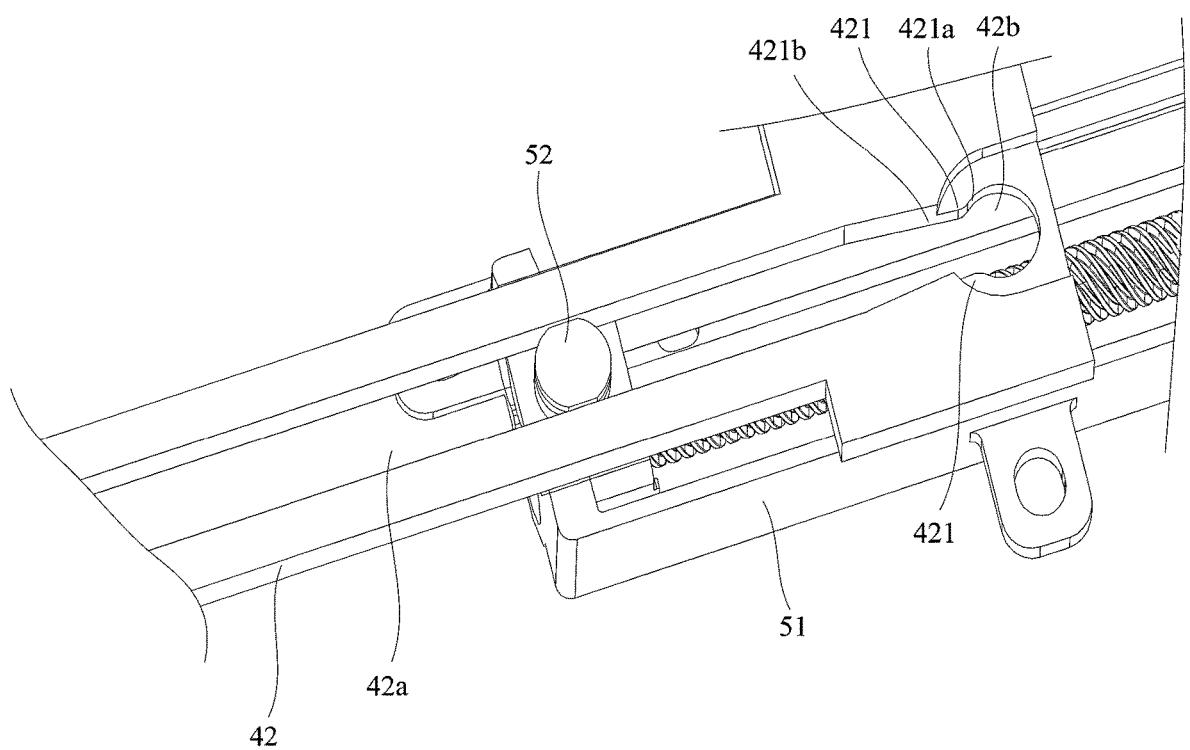
FIG. 6 is a partially enlarged schematic diagram of FIG. 5.

FIG. 6 is a partially enlarged schematic diagram of FIG. 5. As shown in FIG. 6, two catch bumps 421 are disposed on the two opposite sides of the strip-shaped slide slot 42a, and the catch bumps 421 are at a junction of the strip-shaped slide slot 42a and the lock portion 42b.

The catch bumps 421 are configured to limit the movable portion 52. In the case that the movable portion 52 is in the lock portion 42b, the catch bumps 421 restrict the movable portion 52, such that the movable portion 52 is stably connected to the push rod 42. In the case that the second housing 40 is subjected to a large impact, the movable portion 52 squeezes the catch bumps 421, causing a certain deformation of the movable portion 52 or the push rod 42, such that the movable portion 52 passes the catch bumps 421, and is separated from the lock portion 42b, and enters into the strip-shaped slide slot 42a.

The height of the catch stop bump 421 affects the above predetermined value, i.e., affects the acceleration threshold at which the retractable mechanism 20 is switched from the connected state to the disconnected state. Increasing the height of the catch bump 421 causes it less likely for the movable portion 52 to move from the catch bump 421 to the strip-shaped slide slot 42a, and the second housing 40 needs to be subjected to a greater impact to cause the retractable mechanism 20 to be switched from the connected state to the disconnected state. Conversely, reducing the height of the catch bump 421 enables the retractable mechanism 20 to be switched from the connected state to the disconnected state in the case that the second housing 40 is subjected to a smaller impact.

As shown in FIG. 6, the catch bump 421 has a first ramped surface 421a. The first ramped surface 421a is on a side, close to the lock portion 42b, of the catch bump 421.

The first ramped surface 421a serves to guide the movable portion 52 to pass the catch bump 421 along the first ramped surface 421a in the case that the second housing 40 is subjected to a large impact.

In the case that the height of the catch bump 421 is kept constant, it is also possible to change the above predetermined value by adjusting the first ramped surface 421a. The greater the slope of the first ramped surface 421a is, the greater the above preset value is, and conversely the lesser the preset value is. By increasing the slope of the first ramped surface 421a, the acceleration of the second housing 40 when moving relative to the first housing 30 reaches a larger value in the case that the movable portion 52 is separated from the lock portion 42b and enter the strip-shaped slide slot 42a. That is, in the case that the second housing 40 is subjected to a greater impact, the retractable mechanism 20 is switched from the connected state to the disconnected state.

Exemplarily, a slope angle of the first ramped surface 421a ranges from 40° to 60°, i.e., a slope of the first ramped surface 421a ranges from tan 40° to tan 60°.

As shown in FIG. 6, the catch bump 421 also has a second ramped surface 421b, the second ramped surface 421b is on a side, away from the lock portion 42b, of the catch bump 421. The slope of the second ramped surface 421b is less than the slope of the first ramped surface 421a.

In a situation such as dropping of the display device, which causes the second housing 40 to be impacted, and the retractable mechanism 20 is switched to the disconnected state, the drive assembly 50 is temporarily unable to drive the second housing 40 to move relative to the first housing 30. In this way, by causing the movable portion 52 to move relative to the push rod 42, the movable portion 52 is able to move back to the lock portion 42b along the strip-shaped slide slot 42a, and is snap-fitted into the lock portion 42b, such that the retractable mechanism 20 is switched to the connected state. The second ramped surface 421b is able to play a guiding role in the process of switching the retractable mechanism 20 back to the connected state, and it is easier for the movable portion 52 to pass the catch bump 421 and return to the lock portion 42b.

During the process of switching the retractable mechanism 20 from the connected state to the disconnected state, and during the process of resetting the retractable mechanism 20 from the disconnected state to the connected state, the movable portion 52 and the catch bump 421 are squeezed, such that the drive assembly 50 is subjected to a certain force, and the slope of the second ramped surface 421b is set to be smaller than that of the first ramped surface 421a, such that the drive assembly 50 is subjected to a smaller force in the resetting process, and the movable portion 52 more easily passes the catch bump 421.

Exemplarily, the slope angle of the second ramped surface 421b ranges from 5° to 30°, i.e., the slope of the second ramped surface 421b ranges from tan 5° to tan 30°.

Figure 7:
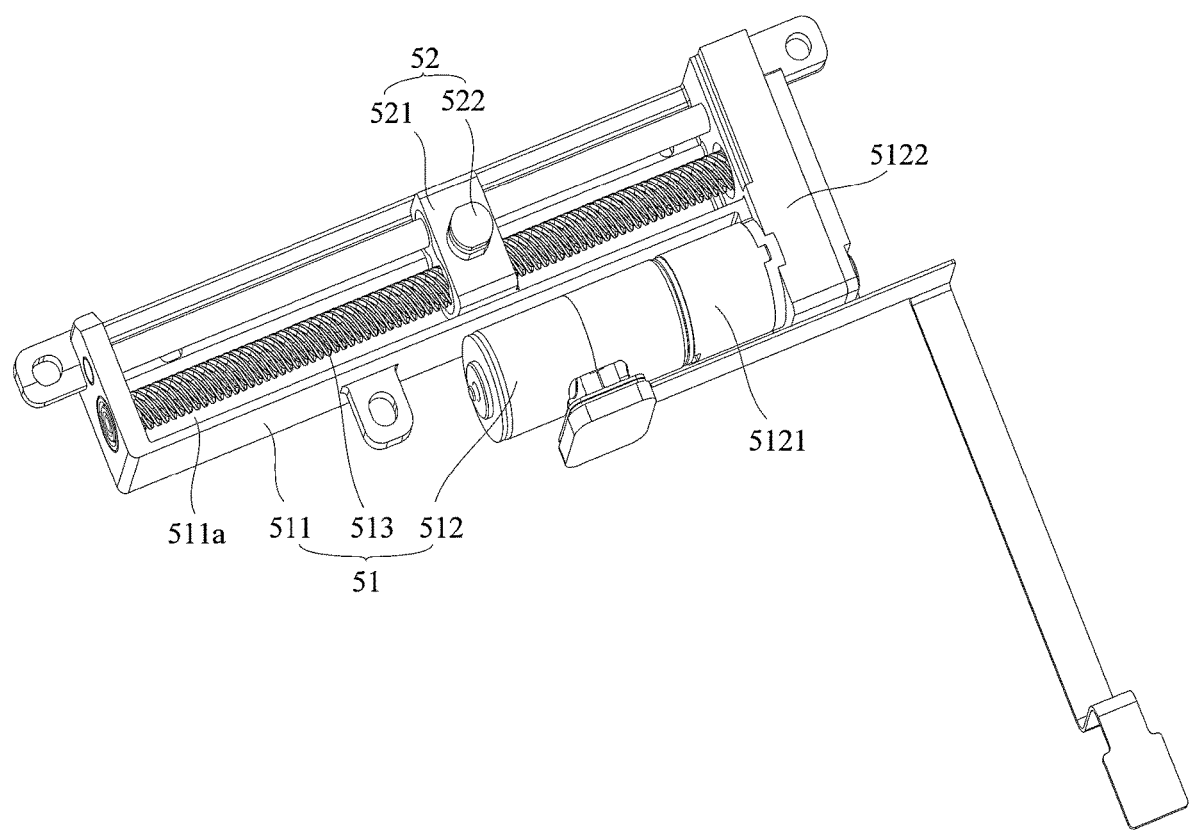
FIG. 7 is a schematic diagram of a structure of a drive assembly according to some embodiments of the present disclosure.

FIG. 7 is a schematic diagram of a structure of a drive assembly according to some embodiments of the present disclosure. As shown in FIG. 7, the drive assembly 50 includes a fixed portion 51 and a movable portion 52, wherein the fixed portion 51 includes a fixing frame 511, a drive member 512, and a transmission member 513. The fixed frame 511 is connected to the first housing 30, and the drive member 512 and the transmission member 513 are both connected to the fixing frame 511, and the drive member 512 is configured to drive the transmission member 513 to move.

The movable portion 52 includes a first slider 521 and a catch bump 522. The first slider 521 is connected to the drive member 513, such that the first slider 521 is driven by the drive member 513 to move. The catch bump 522 is coupled to the first slider 521, and the catch bump 522 is configured to cooperate with the lock portion 42b or the strip-shaped slide slot 42a.

In the embodiments of the present disclosure, the drive member 513 is a screw, the fixing frame 511 has a screw mounting groove 511a, and the screw is rotatably mounted in the screw mounting groove 511a, and the length direction of the screw is consistent with the extending direction of the second housing 40. The drive member 512 is disposed at one end of the screw, and the drive member 512 is configured to drive the screw to rotate. Exemplarily, the drive member 512 includes a motor 5121 and a gearbox 5122, the motor 5121 is connected to an input shaft of the gearbox 5122, and an output shaft of the gearbox 5122 is connected to the screw.

The first slider 521 is disposed in the screw mounting groove 511a and is sleeved outside the screw and threaded with the screw. The catch bump 522 is disposed outside the screw mounting groove 511a and fits with the strip-shaped slide slot 42a or the lock portion 42b of the push rod 42.

The catch bump 522 is snap-fitted into the lock portion 42b in the case that the retractable mechanism 20 is in the connected state. The drive member 512 drives the screw to rotate, and drives the first slider 521 to move along the screw, such that the second housing 40 is driven to extend or retract relative to the first housing 30. Changing the direction of rotation of the screw, the direction of movement of the second housing 40 can be changed.

In the case that the retractable mechanism 20 is in the disconnected state, the catch bump 522 is in the strip-shaped slide slot 42a. The drive member 512 drives the screw to rotate, and drives the first slider 521 to move the catch bump 522 in a direction close to the lock portion 42b. In the case that the catch bump 522 contacts the catch bump 421, the screw continues to rotate, such that the catch bump 522 passes the catch bump 421 along the second ramped surface 421b under the action of the screw and enters into the lock portion 42b, and the resetting of the retractable mechanism 20 is completed.

Figure 8:
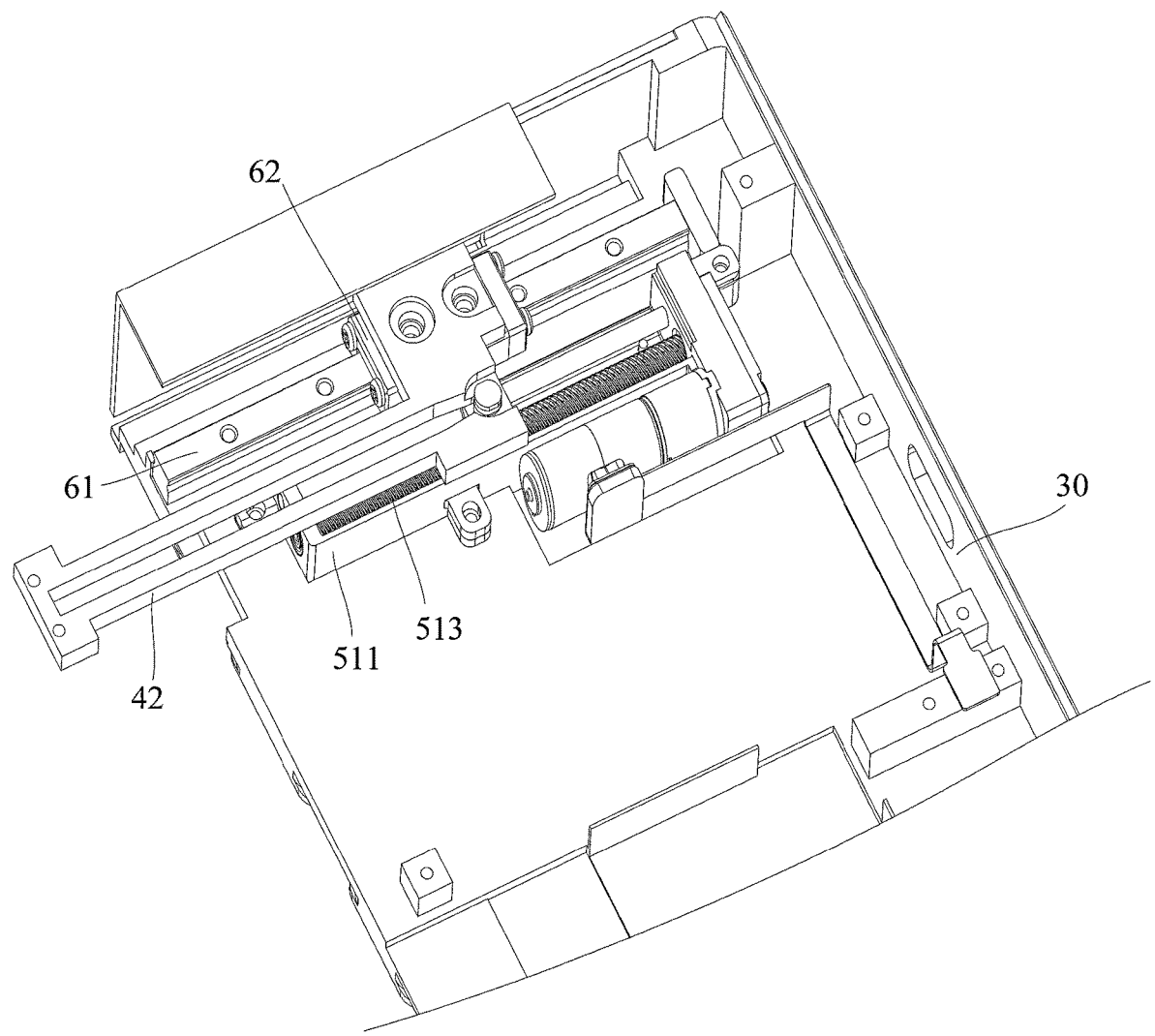
FIG. 8 is a schematic diagram of an internal structure of a retractable mechanism according to some embodiments of the present disclosure.

FIG. 8 is a schematic diagram of the internal structure of the retractable mechanism according to some embodiments of the present disclosure. As shown in FIG. 8, the display device further includes a guide rail 61 and a second slider 62. The second slider 62 is slidingly connected to the guide rail 61. One of the first housing 30 and the second housing 40 is connected to the guide rail 61, and the other of the first housing 30 and the second housing 40 is connected to the second slider 62, such that the first housing 30 and the second housing 40 can move relative to each other more smoothly.

The display device includes a plurality of guide rails 61 and a plurality of second sliders 62. The guide rails 61 and the second sliders 62 are one-to-one provided and the plurality of guide rails 61 are parallel to each other. For example, in some embodiments of the present disclosure, the display device includes two guide rails 61 and two second sliders 62.

As shown in FIG. 8, the guide rails 61 are disposed in the first housing 30, and the length direction of the guide rails 61 is parallel to the extending direction of the second housing 40. In the example, the guide rails 61 are arranged parallel to one side of the screw. The guide rail 61 is connected to the first housing 30, for example by a screw. The second slider 62 is slidingly connected to the guide rail 61. The second slider 62 is connected to the push rod 42, for example by a screw.

Figure 9:
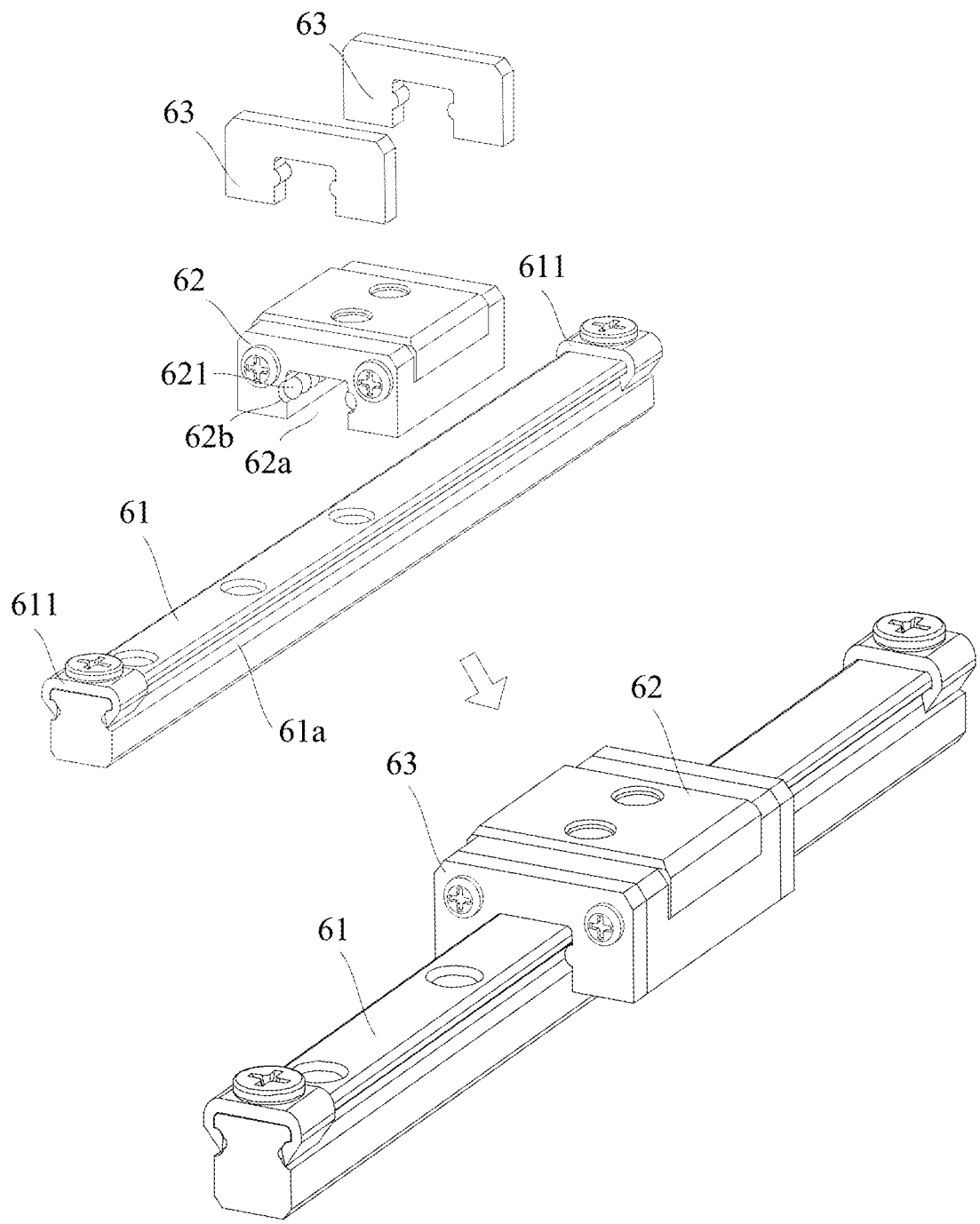
FIG. 9 is a schematic diagram of an assembly of a slider and a guide rail according to some embodiments of the present disclosure.

FIG. 9 is a schematic diagram of an assembly of a slider with a guide rail according to some embodiments of the present disclosure. As shown in FIG. 9, the second slider 62 has a clamp groove 62a and the guide rail 61 is disposed in the clamp groove 62a. By fitting the clamp groove 62a with the guide rail 61, the second slider 62 can be moved along the guide rail 61. Blocks 611 are connected to both ends of the guide rail 61 to limit the range of movement of the second slider 62 and to avoid the second slider 62 from being separated from the end of the guide rail 61.

Exemplarily, the second slider 62 is made of a material with a low coefficient of friction, such as stainless steel, nylon, and polyacetal resin.

A first groove 62b is disposed on the sidewall of the clamp groove 62a has, and a ball 621 is provided in the first groove 62b. A second groove 61a extending in a length direction thereof is disposed on the sidewall of the guide rail 61. The first groove 62b and the second groove 61a are opposite to each other, and the ball 621 is partially disposed in the second groove 61a.

By providing the balls 621 in the first groove 62b and the second groove 61a, the balls 621 roll in the second groove 61a in the case that the second slider 62 moves relative to the guide rail 61, thereby reducing the frictional resistance to which the second slider 62 is subjected and causing the second slider 62 to move more smoothly.

A plurality of balls 621 are provided in each of the first grooves 62b, the plurality of balls 621 are arranged along a length direction of the first grooves 62b. In the case that the second slider 62 is mounted to the guide rail 61, the extending direction of the first groove 62b is consistent with the extending direction of the second groove 61a. The plurality of balls 621 are all partially disposed in the second groove 61a, and the plurality of balls 621 are rolled in the second groove 61a in the case that the second slider 62 slides relative to the guide rail 61.

Figure 10:
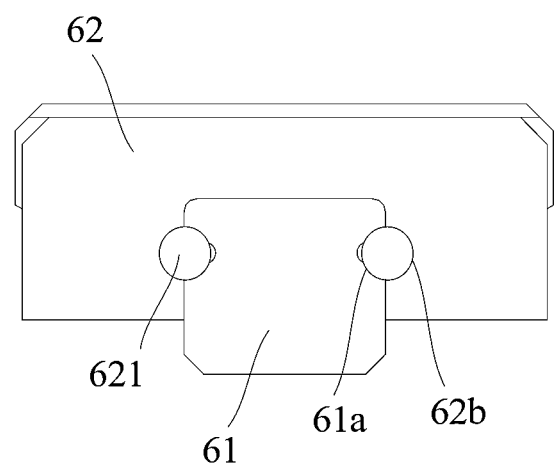
FIG. 10 is a schematic diagram of the fitting of a slider with a guide rail according to some embodiments of the present disclosure.

FIG. 10 is a schematic diagram of the fitting of a slider with a guide rail according to some embodiments of the present disclosure. As shown in FIG. 10, the cross-section of the first groove 62b and the cross-section of the second groove 61a are both circular. The radius of the cross-section of the first groove 62b and the radius of the cross-section of the second groove 61a are the same as the radius of the ball 621.

The precision of the fitting between the balls 621 and the first groove 62b and the second groove 61a affects the smoothness of the operation of the second slider 62. The radius of the cross-section of the first groove 62b and the radius of the cross-section of the second groove 61a are both the same as the radius of the balls 621, such that a 0-clearance contact is formed between the balls 621 and the first groove 62b and the second groove 61a, ensuring that the second slider 62 can move smoothly.

In some embodiments, a cross-section of the second groove 61a is semicircular.

Because the cross-section of the second groove 61a is semicircular, the second slider 62 is able to withstand the load along the depth direction of the clamp groove 62a, such that the second slider 62 is not easily detached from the guide rail 61, which is conducive to prolonging the service life of the second slider 62 and the guide rail 61, as well as the load carrying capacity of the guide rail 61.

By adjusting the diameter of the ball 621, it is also possible to adjust the precision of the fitting between the clamp groove 62a of the second slider 62 and the guide rail 61. Exemplarily, the fitting between the clamp groove 62a and the guide rail 61 can be a transition fitting, i.e., it can be a clearance fitting or an interference fitting. For example, the gap ranges form −3 μm to 3 μm to avoid too much looseness between the second slider 62 and the guide rail 61 which affects the relative motion between the first housing 30 and the second housing 40.

As shown in FIG. 9, the display device further includes two end covers 63. The two end cover 63 are disposed at each end of the clamp groove 62a. The two end cover 63 are connected to the second slide 62, for example by a screw.

The end covers 63 are provided at the two ends of the clamp groove 62a to shield the balls 621, which can avoid the balls 621 from falling out of the second slider 62, and can also play the role of sealing, preventing dust and other foreign matter from entering into the first groove 62b, which affects the rolling of the balls 621.

As an example, the drive assembly 50, the push rod 42, the guide rail 61, and the second slider 62 are provided in two groups, i.e., as shown in FIG. 3, the drive assembly 50, each of the push rod 42, the guide rail 61, and the second slider 62 is two, close to the two sides of the first housing 30. In other examples, the drive assembly 50, the push rod 42, the guide rail 61 and the second slider 62 are provided in one group, i.e., the drive assembly 50, each of the push rod 42, the guide rail 61 and the second slider 62 is one. In the case that one group is provided, the drive assembly 50, the push rod 42, the guide rail 61 and the second slider 62 are disposed in the middle of the first housing 30 for smoother extension and retraction of the second housing 40. In addition, the push rods 42 have a greater width to improve the structural strength of the push rods 42.

Figure 11:
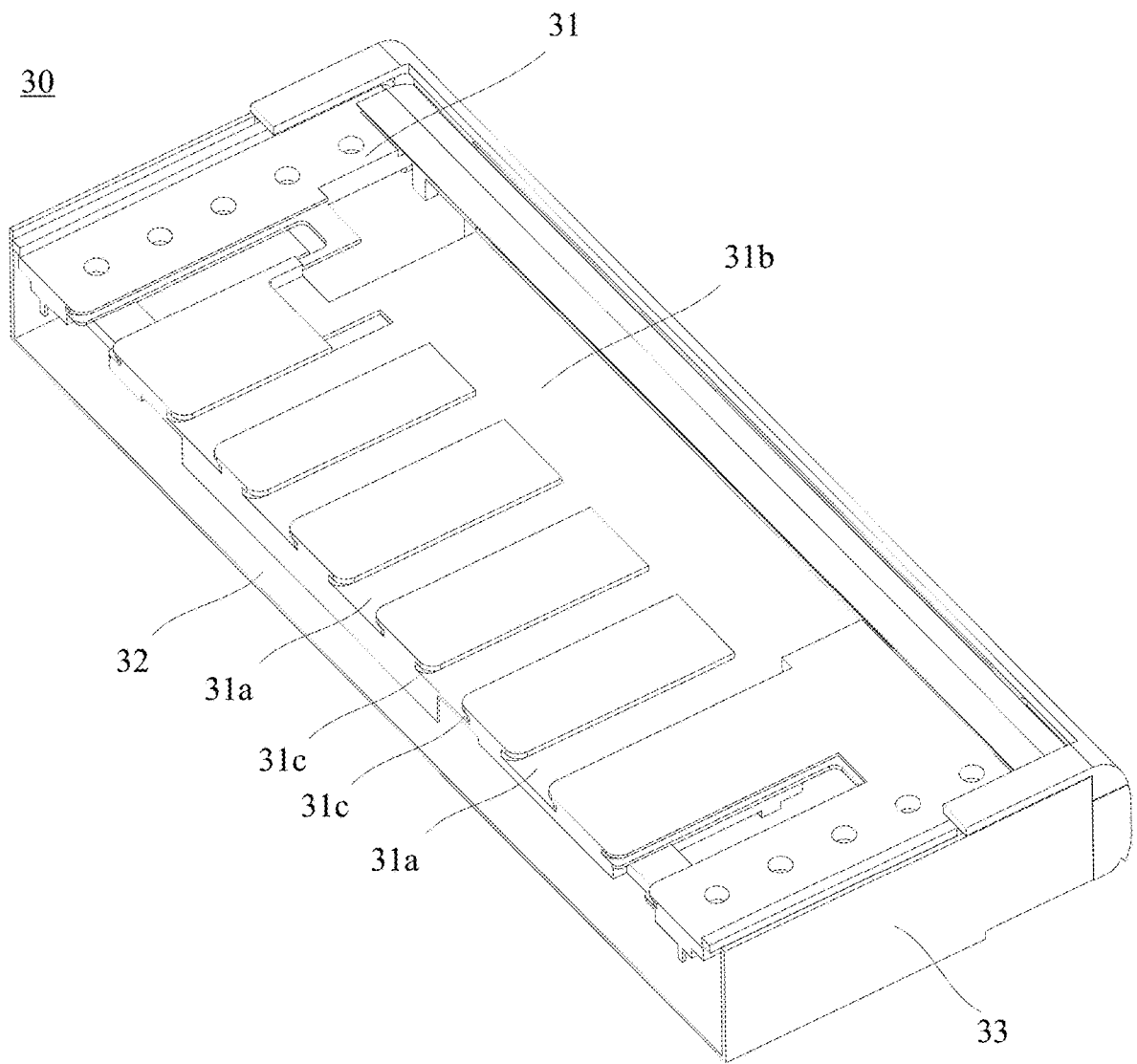
FIG. 11 is a schematic diagram of a structure of a first housing according to some embodiments of the present disclosure.

FIG. 11 is a schematic diagram of a structure of a first housing according to some embodiments of the present disclosure. As shown in FIG. 11, in the embodiment of the present disclosure, the first housing 30 includes a top plate 31, a back plate 32, and a plurality of side plates 33. The top plate 31 and the back plate 32 are opposite to each other, the plurality of side plates 33 are disposed between the top plate 31 and the back plate 32 and connected to the top plate 31 and the back plate 32. The top plate 31, the back plate 32, and the plurality of side plates 33 enclose a box structure having an opening 30a on one side to partially shelter the first housing 30. One end of the flexible display panel 10 is disposed outside of the first housing 30, that is, outside of the space enclosed by the top plate 31, the back plate 32, and the plurality of side panels 33, specifically on the side, away from the back plate 32, of the top plate 31.

The first housing 30 is in one structure or a removable structure. For example, the back plate 32 is removably connected to the side panels 33 to facilitate disassembly and assembly of the display device. The first housing 30 is made of metal or non-metal, or is made partly of metal and partly of non-metal.

The outer surface of the first housing 30 has a plurality of sockets 31a, and the sockets 31a are disposed on the surface, away from the back plate 32 of the top plate 31, extending from the side, close to the opening 30a, of the top plate 31 to the other side.

Referring to FIG. 4, the movable housing body 41 includes a support portion 411 and a sliding support plate 412. The sliding support plate 412 and the push rod 42 are connected to the same side of the support portion 411, and the sliding support plate 412 includes a plurality of comb support plates 413. The length direction of the comb support plates 413 is consistent with a retraction direction of the second housing 40. The plurality of comb support plates 413 are disposed in a plurality of sockets 31a.

The plurality of comb support plates 413 are spaced apart from each other, such that the sliding support plate 412 has an overall comb tooth shape. The plurality of comb support plates 413 form a fitting with the plurality of sockets 31a, which serves as a guide to cause the second housing 40 to move smoother.

As shown in FIG. 4, of the plurality of comb support plates 413, adjacent comb support plates 413 are not equally spaced, and comb support plates 413 closer to the sides are more widely spaced. In other examples, the spacing of adjacent comb support plates 413 in the plurality of comb support plates 413 are equal.

The support portion 411 and the sliding support plate 412 are in one structure or are two removable portions. The movable housing body 41 is a metal member, a non-metallic member, or one portion is a metal member and the other portion is a non-metallic member. For example, the support portion 411 is a non-metallic member and the sliding support plate 412 is a metallic member.

As shown in FIG. 4, the support portion 411 includes a roller shaft 4111 and a roller stand 4112, and the roller shaft 4111 and the push rod 42 are disposed on opposite sides of the roller stand 4112 and are connected to the roller stand 4112.

The roller shaft 4111 is rotationally connected to the roller stand 4112, and the roller shaft 4111 is capable of rotating relative to the roller stand 4112. The flexible display panel 10 is wound from the exterior to the interior of the second housing 40 by the roller shaft 4111, such that the flexible display panel 10 moves relative to the second housing 40 with less resistance and moves smoother.

As shown in FIG. 4, the comb support plate 413 includes a strip portion 4131 and a spade portion 4132. One end of the strip portion 4131 is coupled to the support portion 411, and the spade portion 4132 is disposed at the other end of the strip portion 4131 and is coupled to the strip portion 4131.

Figure 12:
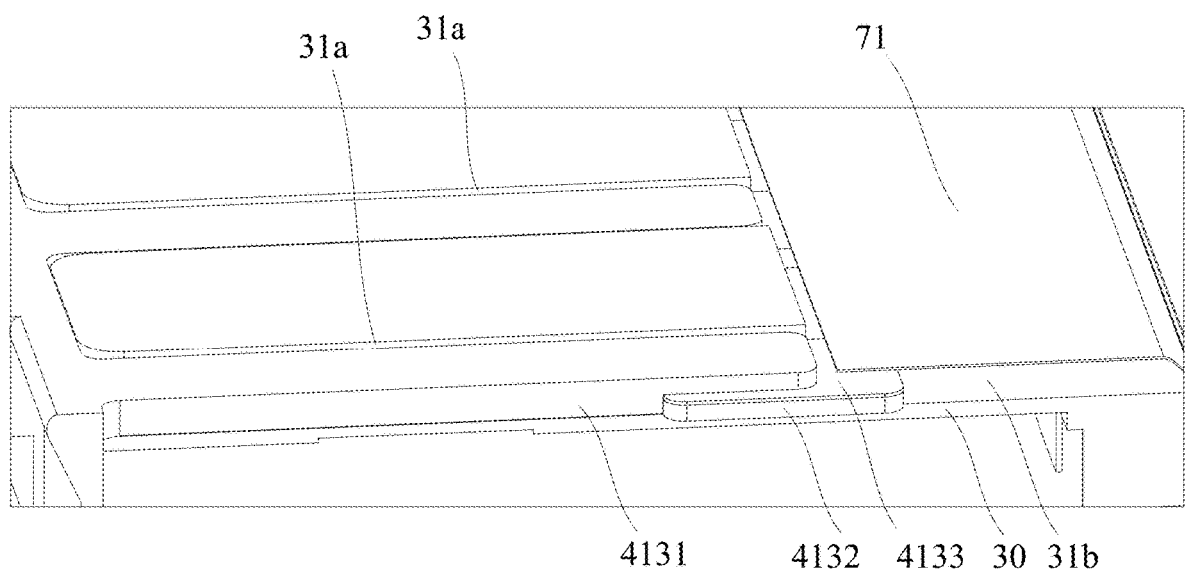
FIG. 12 is a schematic diagram of the cooperation between a comb support plate and a first housing according to some embodiments of the present disclosure.

FIG. 12 is a schematic diagram of a fit between a comb support plate and a first housing according to some embodiments of the present disclosure. The figure also schematically illustrates a flexible circuit board 71 of the display device. As shown in FIG. 12, a distance from a side, away from a bottom surface of the socket 31a, of the spade portion 4132 to a bottom surface of the socket 31a is less than a distance from a side, away from a bottom surface of the socket 31a, of the strip-shaped portion 4131 to a bottom surface of the socket 31a. That is, the spade portion 4132 forms a step surface with the strip portion 4131.

In this example, the thickness of the spade portion 4132 is less than the thickness of the strip portion 4131, and the side of the spade portion 4132 and the strip portion 4131 close to the bottom surface of the socket 31a are flush with each other. In the case that the second housing 40 is closed to the first housing 30, the spade portion 4132 occupies a smaller thickness, which is conducive to saving the internal space of the display device and making the structure more compact.

As shown in FIG. 12, the outer surface of the first housing 30 also has a circuit board accommodation recess 31b, and the circuit board accommodation recess 31b is disposed at the end portion of the plurality of sockets 31a and is connected to the end portion of the plurality of sockets 31a. In the case that the second housing 40 is closed, the spade portion 4132 is disposed in the circuit board accommodation recess 31b.

In this example, the circuit board accommodation recess 31b is disposed on a surface, away from the back plate 32, of the top plate 31 at an end, away from the opening 30a, of the socket 31a, and in communication with the socket 31a. In the case that the second housing 40 is retracted, the spade portion 4132 protrudes from the end of the socket 31a and enters into the circuit board accommodation recess 31b. The spade portion 4132 is thin and can be concealed between the flexible circuit board 71 and the bottom of the groove of the circuit board accommodation recess 31b. In the case that the second housing 40 extends outwardly from the first housing 30, the spade portion 4132 is in the socket 31a and the strip portion 4131 can exit the socket 31a completely, allowing the second housing 40 to have a greater extension and retraction travel and the display device to have a larger display area.

In some embodiments, a friction-reducing layer 4133 is disposed on a side, away from the bottom surface of the socket 31a, of the spade portion 4132.

The friction reduction layer 4133 is provided to reduce friction that arises between the spade portion 4132 and the circuit board in the circuit board accommodation recess 31b.

Exemplarily, the friction-reducing layer 4133 is formed from a material with a low coefficient of friction such as a polyformaldehyde resin, a polytetrafluoroethylene, and a copper.

As shown in FIG. 12, the width of the spade portion 4132 is larger than the width of the strip portion 4131. Referring to FIG. 11, a limiting groove 31c is disposed on the side wall of the socket 31a. The spade portion 4132 is disposed in the limiting groove 31c to limit the sliding support plate 412.

In some embodiments, the thickness of the strip portion 4131 of the sliding support plate 412 is the same as the depth of the socket 31a, which allows the strip portion 4131 to be close to the surface of the flexible display panel 10 and flush with the outer surface of the top plate 31 in the display device, so as to facilitate the provision of support to the flexible display panel 10 to keep the flexible display panel 10 flat.

Figure 13:
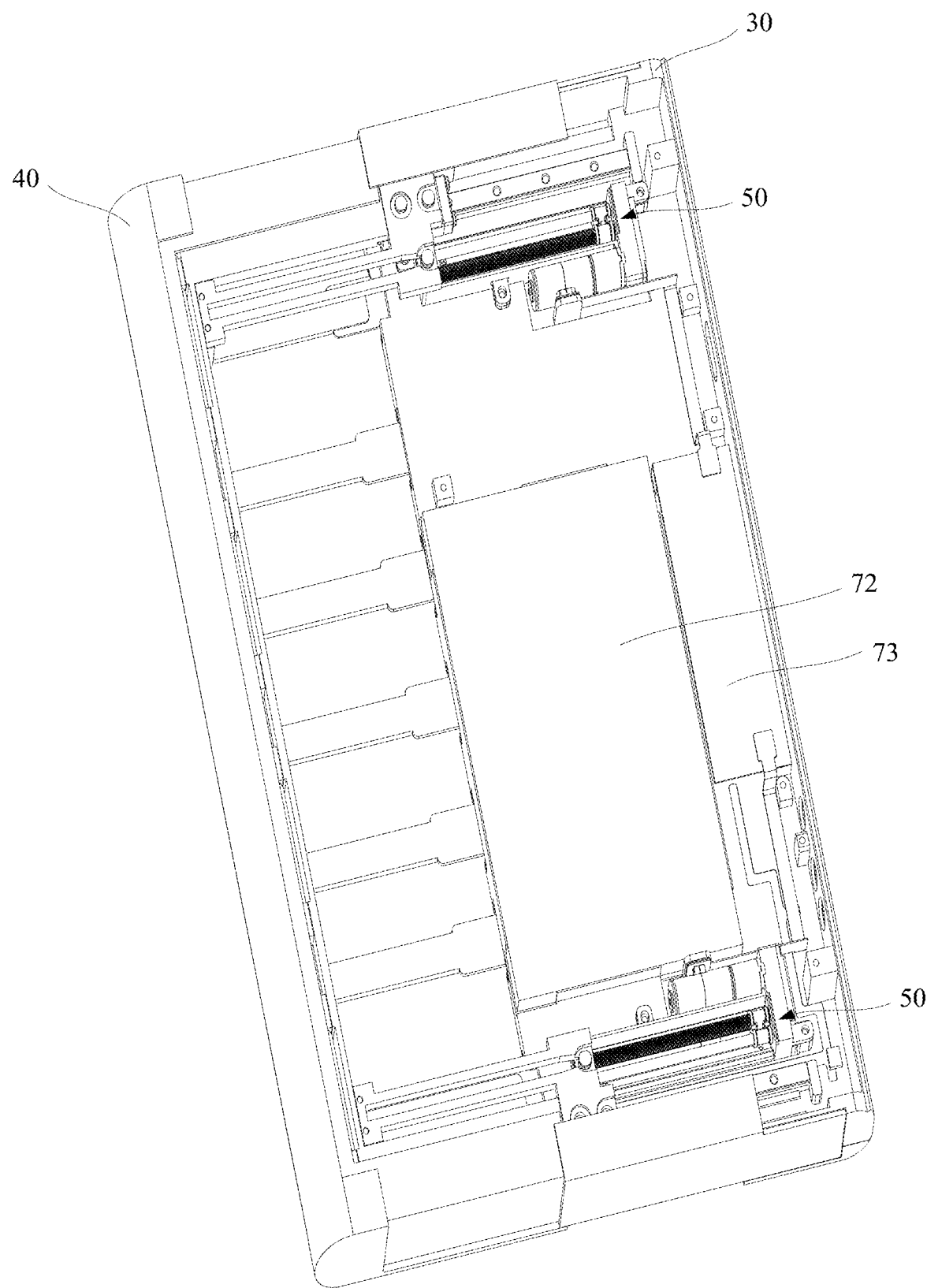
FIG. 13 is a schematic diagram of a structure of a display device according to some embodiments of the present disclosure.

FIG. 13 is a schematic diagram of a structure of a display device according to some embodiments of the present disclosure. In FIG. 13, at least a portion of the structure of the flexible display panel 10, as well as a portion of the structure of the first housing 30, and a portion of the structure of the second housing 40, are omitted in order to show the internal structure of the display device. As shown in FIG. 13, the display device further includes a main board 73, a battery 72, and a flexible circuit board 71 (shown in FIG. 12), the main board 73 and the battery 72 are disposed in the first housing 30, the battery 72 is close to the opening 30a of the first housing 30 and between the two drive assemblies 50. The main board 73 is disposed on the side, away from the opening 30a, of the battery 72. Each of the two drive assemblies 50 is electrically connected to the main board 73. The flexible circuit board 71 is disposed in a circuit board accommodation recess 31b in the outer surface of the first housing 30. The flexible circuit board 71 is connected to the main board 73 and the flexible display panel 10. In the case that the second housing 40 is closed, the spade portion 4132 is disposed between the flexible circuit board 71 and the bottom of the groove of the circuit board accommodation recess 31b.

The above are only optional embodiments of this application and are not intended to limit this application, and any modifications, equivalent substitutions, improvements, etc. made within the spirit and principles of this application shall be included in the scope of protection of this application.

What is claimed is:

1. A retractable mechanism for a display device, comprising: a first housing, a second housing, and a drive assembly, the first housing being movably connected to the second housing; wherein
the drive assembly is disposed in the first housing and is connected to the first housing;
the retractable mechanism has a connected state and a disconnected state, in the connected state, the second housing is connected to the drive assembly and is able to extend or retract relative to one side of the first housing under driving by the drive assembly, and in the disconnected state, the second housing is separated from the drive assembly; and
the retractable mechanism is configured to be switched from the connected state to the disconnected state in response to an acceleration of the second housing moving relative to the first housing being greater than a predetermined value.

2. The retractable mechanism according to claim 1, wherein the second housing comprises a movable housing body and a push rod, wherein the movable housing body is movably connected to the first housing, one end of the push rod is connected to the movable housing body, and the other end of the push rod is disposed in the first housing and is connected to the drive assembly.

3. The retractable mechanism according to claim 2, wherein a strip-shaped slide slot is defined in the push rod has, wherein a length direction of the strip-shaped slide slot is consistent with a retraction direction of the second housing, an end, away from the movable housing body, of the strip-shaped slide slot has a lock portion, and the lock portion is connected to the strip-shaped slide slot; and
the drive assembly comprises a fixed portion and a movable portion, the fixed portion is connected to the first housing, the movable portion is movably connected to the fixed portion, the movable portion is snap-fitted into the lock portion in the connected state, and in the disconnected state, the movable portion is in the strip-shaped slide slot and is in clearance fit with the strip-shaped slide slot.

4. The retractable mechanism according to claim 3, wherein two catch bumps are disposed on opposite side walls the strip-shaped slide slot, and the catch bumps are disposed at a junction of the strip-shaped slide slot and the lock portion.

5. The retractable mechanism according to claim 4, wherein the catch bump has a first ramped surface, wherein the first ramped surface is on a side, close to the lock portion, of the catch bump.

6. The retractable mechanism according to claim 5, wherein the catch bump further has a second ramped surface, wherein the second ramped surface is disposed on a side, away from the lock portion, of the catch bump, and a slope of the ramped surface is less than a slope of the first ramped surface.

7. The retractable mechanism according to claim 2, wherein the movable housing body comprises a support portion and a sliding support plate, wherein the sliding support plate and the push rod are connected to one side of the support portion, and the sliding support plate comprises a plurality of comb support plates, wherein a length direction of each of the comb support plates is consistent with a retraction direction of the second housing, and a plurality of sockets are defined in an outer surface of the first housing, wherein the plurality of comb support plates are disposed in the plurality of sockets.

8. The retractable mechanism according to claim 7, wherein the comb support plate comprises a strip portion and a spade portion, wherein one end of the strip portion is connected to the support portion, the spade portion is disposed at the other end of the strip portion and connected to the strip portion, and a distance from a side, away from a bottom surface of the socket, of the spade portion to the bottom surface of the socket is less than a distance from a side, away from the bottom surface of the socket, of the strip portion to the bottom surface of the socket.

9. The retractable mechanism according to claim 8, wherein a circuit board accommodation recess is further defined in the outer surface of the first housing, wherein the circuit board accommodation recess is disposed at end portions of the plurality of sockets and is connected to the end portions of the plurality of sockets, and in response to the second housing being retracted, the spade portion is received in the circuit board accommodation recess.

10. The retractable mechanism according to claim 8, wherein a friction-reducing layer is disposed on a side, away from the bottom surface of the socket, of the spade portion.

11. The display device according to claim 1, wherein the second housing comprises a movable housing body and a push rod, wherein the movable housing body is movably connected to the first housing, one end of the push rod is connected to the movable housing body, and the other end of the push rod is disposed in the first housing and is connected to the drive assembly.

12. The display device according to claim 11, wherein a strip-shaped slide slot is defined in the push rod has, wherein a length direction of the strip-shaped slide slot is consistent with a retraction direction of the second housing, an end, away from the movable housing body, of the strip-shaped slide slot has a lock portion, and the lock portion is connected to the strip-shaped slide slot; and the drive assembly comprises a fixed portion and a movable portion, the fixed portion is connected to the first housing, the movable portion is movably connected to the fixed portion, the movable portion is snap-fitted into the lock portion in the connected state, and in the disconnected state, the movable portion is in the strip-shaped slide slot and is in clearance fit with the strip-shaped slide slot.

13. The display device according to claim 12, wherein two catch bumps are disposed on opposite side walls the strip-shaped slide slot, and the catch bumps are disposed at a junction of the strip-shaped slide slot and the lock portion.

14. The display device according to claim 13, wherein the catch bump has a first ramped surface, wherein the first ramped surface is on a side, close to the lock portion, of the catch bump.

15. The display device according to claim 14, wherein the catch bump further has a second ramped surface, wherein the second ramped surface is disposed on a side, away from the lock portion, of the catch bump, and a slope of the ramped surface is less than a slope of the first ramped surface.

16. The display device according to claim 11, wherein the movable housing body comprises a support portion and a sliding support plate, wherein the sliding support plate and the push rod are connected to one side of the support portion, and the sliding support plate comprises a plurality of comb support plates, wherein a length direction of each of the comb support plates is consistent with a retraction direction of the second housing, and a plurality of sockets are defined in an outer surface of the first housing, wherein the plurality of comb support plates are disposed in the plurality of sockets.

17. The display device according to claim 16, wherein the comb support plate comprises a strip portion and a spade portion, wherein one end of the strip portion is connected to the support portion, the spade portion is disposed at the other end of the strip portion and connected to the strip portion, and a distance from a side, away from a bottom surface of the socket, of the spade portion to the bottom surface of the socket is less than a distance from a side, away from the bottom surface of the socket, of the strip portion to the bottom surface of the socket.

18. The display device according to claim 17, wherein a circuit board accommodation recess is further defined in the outer surface of the first housing, wherein the circuit board accommodation recess is disposed at end portions of the plurality of sockets and is connected to the end portions of the plurality of sockets, and in response to the second housing being retracted, the spade portion is received in the circuit board accommodation recess.

19. The display device according to claim 17, wherein a friction-reducing layer is disposed on a side, away from the bottom surface of the socket, of the spade portion.

20. A display device, comprising a flexible display panel and a retractable mechanism, wherein the retractable mechanism comprises: a first housing, a second housing, and a drive assembly, the first housing being movably connected to the second housing; wherein the drive assembly is disposed in the first housing and is connected to the first housing;

the retractable mechanism has a connected state and a disconnected state, in the connected state, the second housing is connected to the drive assembly and is able to extend or retract relative to one side of the first housing under driving by the drive assembly, and in the disconnected state, the second housing is separated from the drive assembly;

the retractable mechanism is configured to be switched from the connected state to the disconnected state in response to an acceleration of the second housing moving relative to the first housing being greater than a predetermined value; and the flexible display panel is connected to the first housing and the second housing.

\* \* \* \* \*